United States Patent [19]

Retrum

[11] 4,269,865
[45] May 26, 1981

[54] PROCESS FOR THE PRODUCTION OF A FOOD PRODUCT FROM FEATHERS

[75] Inventor: Rowland Retrum, St. Louis, Mo.

[73] Assignee: Ralston Purina Company, St. Louis, Mo.

[21] Appl. No.: 84,345

[22] Filed: Oct. 12, 1979

Related U.S. Application Data

[63] Continuation of Ser. No. 922,934, Jul. 10, 1978, abandoned.

[51] Int. Cl.³ .................................................. A23J 3/00
[52] U.S. Cl. .................................. 426/657; 260/123.7; 426/506; 426/807
[58] Field of Search ................. 426/55, 644, 647, 506, 426/520, 807, 59, 519, 646, 805, 657; 260/412.6, 123.7

[56] References Cited

U.S. PATENT DOCUMENTS

| | | | |
|---|---|---|---|
| Re. 25,138 | 3/1962 | Brown et al. | 426/506 |
| 1,854,270 | 4/1932 | McGilton | 260/412.6 |
| 2,597,566 | 11/1949 | Bernard et al. | 426/657 |
| 2,702,245 | 2/1955 | Mayer et al. | 426/807 |
| 2,996,383 | 8/1961 | Gershon | 426/630 |
| 3,171,847 | 3/1965 | Aikins | 260/412.6 |
| 3,272,599 | 9/1966 | Albright et al. | 260/412.6 |
| 3,272,632 | 9/1966 | Speer | 426/438 |

*Primary Examiner*—S. Leon Bashore
*Assistant Examiner*—Steve Alvo
*Attorney, Agent, or Firm*—Virgil B. Hill

[57] ABSTRACT

A process for the conversion of feathers into a foodstuff is disclosed wherein moistened feathers are subjected to an elevated temperature and a pressure of 15–40 psig without agitation to form a pulpy mass of the feathers. The pulpy mass of feathers is then hydrolyzed at a pressure of 40–80 psig, to convert the feathers into a highly nutritious food product. The converted feathers can be dried to form a highly nutritious feather meal or combined with other poultry by-products such as offal or blood to form an aggregate or mixture of these by-products.

3 Claims, 1 Drawing Figure

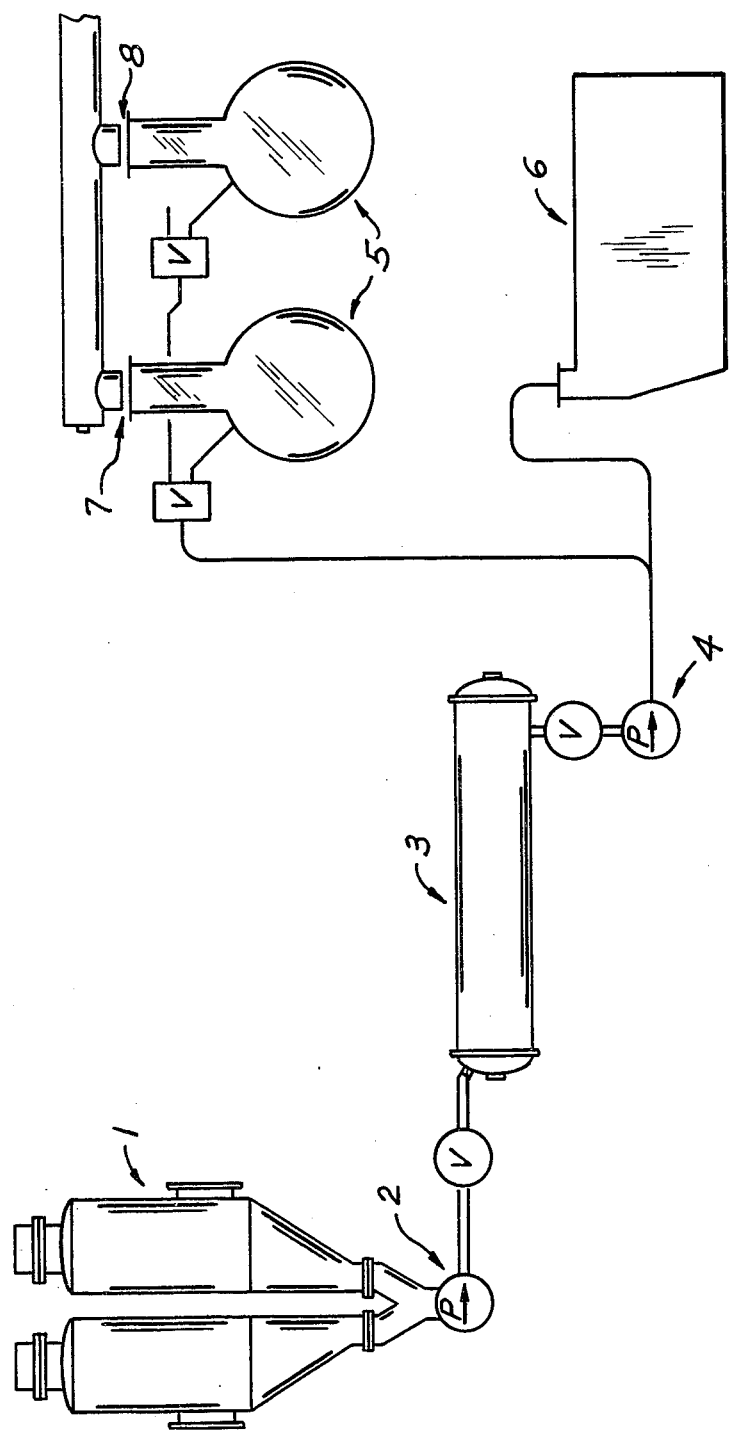
FIG. I

PROCESS FOR THE PRODUCTION OF A FOOD PRODUCT FROM FEATHERS

This is a continuation, of application Ser. No. 922,934, filed July 10, 1978, now abandoned.

BACKGROUND OF THE INVENTION

The present invention relates to a process of forming usable food products having improved nutritive properties from poultry waste such as feathers and offal.

The production of food or feed products from various by-products of food rendering operations is a highly desirable objective since the commerical usefulness of these by-products generally determines whether or not the food rendering operation as a whole is economically viable. This has been especially true in the poultry rendering industry where extensive amounts of by-products or waste materials such as feathers and offal are available for further processing. Accordingly, various techniques have been proposed by the art for further processing of these waste materials to convert them to a more usable form. The techniques proposed include that set forth in U.S. Pat. No. 2,702,245 wherein steam treatment of the feathers is for a period of 1-1½ hours, with agitation to convert the feathers into a high protein feed product. An alternative technique is described in U.S. Pat. No. 3,272,632 wherein poultry waste such as offal, blood, and feathers are converted into a nutritious product by cooking of these materials in hot oil at a temperature sufficient to dehydrate the feathers as well as quickly cook these materials thereby yielding a more desirable food or feed product. U.S. Pat. No. 3,071,468 describes a process for the conversion of poultry offal into a usable food product wherein autolytic action in the offal is induced by maintaining the temperature of the offal within a specific temperature range for a period of time sufficient to convert the offal into a food stuff. Any of these techniques, while presenting the possibility of producing usable food products from poultry waste or by-products, nevertheless, represent processes of the type that usually can only be done efficiently on a batch or non-continuous basis thereby reducing the overall efficiency of the process. Also the use of hot oil alters the characteristics of the final prouct and enzymatic hydrolysis does not proceed rapidly enough to provide an efficient means of converting the waste material.

It is, therefore, an object of the present invention to provide a process for the production of usable food products from poultry by-products or waste materials such as feathers, blood or offal.

It is also an object of the present invention to provide a process for production of usable materials from poultry by-products wherein a high degree of efficiency is maintained and a product of high nutritive properties is also obtained.

It is a further object of the present invention to provide a process for the specific conversion of poultry by-products such as feathers into highly nutritious form wherein conversion can be done on a semi-continuous basis either separately or in conjunction with conversion of poultry offal.

SUMMARY OF THE INVENTION

The present invention provides a process for conversion of poultry by-products or waste materials into highly nutritious and usable food products comprising the steps of; subjecting moistened feathers to elevated pressure and temperature while avoiding agitation of the feathers to convert them to pulpy mass; followed by mechanically agitating the pulpy mass of feathers under conditions of elevated pressure and temperature to hydrolyze or convert the pulpy mass of feathers into a proteinaceous product that is nutritionally available to animals. This provides a means of converting one of the primary by-products from a poultry operation, specifically feathers, into a usable food product and increasing its nutritive properties. The converted feathers can be used as a highly acceptable hydrolyzed feather product upon drying or it can be combined with separately converted poultry offal or blood to produce a proteinaceous aggregate of these various by-products, also of highly acceptable nutritive properties.

The use of specific steps to treat the feathers improves the overall nutritive and functional properties of the proteinaceous aggregate containing other converted by-products as evidenced by feeding and digestibility tests carried out with the proteinaceous aggregate. Furthermore, the converted or hydrolyzed feather product also represents a product of improved nutritive properties over prior art means of conversion since the use of a separate heating step without agitation of the feathers prior to hydrolysis to convert the feathers to a pulpy mass not only improves the nutritive properties but permits hydrolysis of the feathers on a continuous basis thereby improving overall process efficiency and economy.

BRIEF DESCRIPTION OF THE DRAWINGS

FIG. 1 depicts illustrative equipment and a schematic diagram of the present process.

DESCRIPTION OF THE PREFERRED EMBODIMENTS

A detailed understanding of the present invention may be had with reference to the following detailed description thereof when taken in connection with the accompanying drawing which depicts illustrative equipment for practicing the process of the present invention.

With the specific reference to FIG. 1, feathers in a moistened condition either with or without added water, are conveyed from a slaughtering plant or rendering operation. If desired, these feathers may be ground or chopped but this is not a limiting factor in the present process. The wet feathers are loaded into a predigest tank 1, which is then closed and wherein the feathers are subjected to heat, thereby vaporizing the water associated with the feathers and thus pressurizing the vessel. The feathers are pressurized, in excess of atmospheric pressure, preferably not in excess of 40 psig, in order to convert the feathers to a pumpable pulpy mass which can be conveniently conveyed to the hydrolyzer or digest unit 3. This initial heating of the feathers at a relatively low pressure has been found to be a highly significant factor in obtaining highly nutritive end products as well as in improving the overall efficiency of the process thereby making the hydrolysis step adaptable for operation on a continuous basis. The use of relatively low pressure for a somewhat limited period of time under conditions which avoids substantial agitation converts the feathers to a pumpable pulpy mass which is more readily and quickly converted during hydrolysis to a highly nutritious and digestible food product. A preferred time for this step of the process is about 10 minutes at a pressure of 20 psig, although pressures of 15 to 40 psig for times from 5–15 minutes can also be used.

The pulpy mass of feathers is then pumped through the hydrolyzer by "in feed" pump 2 into the digestor or hydrolysis unit 3. At this particular stage, the feathers are digested or hydrolyzed to convert the protein to a usable form as a food or feed product. This is accomplished by agitation of the pulpy mass of feathers under conditions of elevated temperature and pressure to hydrolyze the feathers. It has been determined that the highest quality product in terms of nutritive properties is achieved with steam pressures of 40–80 psig, and retention times of 15 minutes or less, preferably 3–15 minutes. A preferred combination of pressure and retention time is 60 psig and a retention time in the hydrolysis unit of 10 minutes. This retention time provides for vigorous agitation of the mass of feathers and at the noted combination of pressure and temperature a product is obtained which has approximately 75% digestible protein as measured by a standard pepsin digestibility test. This set of conditions convert the feathers to a nutritionally available proteinaceous product suitable as a potential food or feed ingredient. This combination of pressure and retention time not only improves the nutritive properties but lends itself well to a process of the type envisioned in the present invention because of the relatively short retention times required for the hydrolysis step as compared to the prior art. For example, without preheating of the feathers at elevated pressure to convert them to a pulpy mass, prior to the hydrolysis step of the present invention, a conventional process with agitation would require a processing time of 1–1½ hours as compared to times considerably less than this in the present invention. Obviously, the shorter retention times in processing makes the present process more adaptable for use on a semi-continuous basis as compared to prior art processes.

The hydrolyzed feather product is them pumped through the hydrolysis unit "out feed" pump 4 to either of two alternative destinations. If desired, the feathers can be conveyed to a drying unit 6 and dried to form a highly desirable feather meal or alternatively can be conveyed to collecting zone 5 where it can be combined with other poultry by-products such as poultry offal or blood in separate steps at points 7 and 8 respectively. In this regard, the offal or method of processing the same is not intended to limit the present invention since the improved nutritional characteristics of the product of the present invention is primarily dependent on the unique process for separate treatment of the feathers to convert them to a nutritionally available form. Therefore, the wet poultry offal comprising heads, feet, innards, etc. typically may be combined with the hydrolyzed feather product for drying. The blood, which is usually separately available in a rendering operation, may also be combined with the offal and hydrolyzed feather product for joint drying to produce an aggregate of these different waste materials.

This by-product aggregate product desired pursuant to the present process generally will have a protein content of 70% or greater as compared to 60% or so for a conventionally processed poultry meal.

Following combination of the offal, blood, and hydrolyzed feather product, the aggregate product can be dried in conventional fashion, then "pressed out" to remove a substantial percentage of the fat in conventional fashion.

Having described the present invention with reference to the above described embodiment, it is to be understood that numerous variations may be made without departing from the spirit of the present invention and it is intended to encompass such variations or equivalents within the scope of the present invention.

I claim:

1. A process for the conversion of feathers into a food product comprising:
   a. subjecting moistened feathers in a closed tank to a pressure of 15–40 psig and elevated temperature without agitation for at least about 5 minutes but less than about 15 minutes to form a pumpable pulpy mass of feathers;
   b. pumping the pulpy mass to a digester
   c. agitating the pulpy mass of feathers in the digester at a pressure greater than the pressure in step (a) and in the range of 40–80 psig for at least about 3 minutes but less than about 15 minutes to hydrolyze and digest the feathers to convert the mass of feathers into a highly nutritious food product having greater than about 70% digestible protein.

2. The process of claim 1 including the step of drying said hydrolyzed feather product.

3. The process of claim 1 wherein said pulpy mass is formed at pressures of 20 psig for 10 minutes.

* * * * *